United States Patent [19]

Katagiri

[11] Patent Number: 5,742,143
[45] Date of Patent: Apr. 21, 1998

[54] MOTOR CONTROL SYSTEM WITH SELECTIVELY OPERATED A/D CONVERTOR

[75] Inventor: Takashi Katagiri, Nagano, Japan

[73] Assignee: Kabushiki Kaisha Sankyo Seiki Seisakusho, Nagano, Japan

[21] Appl. No.: 588,699

[22] Filed: Jan. 19, 1996

[30] Foreign Application Priority Data

Jan. 20, 1995 [JP] Japan .................................. 7-026230

[51] Int. Cl.$^6$ .................................................. H02P 7/00
[52] U.S. Cl. ........................................ 318/625; 318/632
[58] Field of Search .................................. 318/625, 632, 318/38, 46, 51, 101, 102

[56] References Cited

U.S. PATENT DOCUMENTS

| | | | |
|---|---|---|---|
| 4,090,120 | 5/1978 | Leenhouts | 318/625 |
| 4,641,069 | 2/1987 | Fujioka et al. | 318/625 |
| 4,721,052 | 1/1988 | Omae et al. | 318/625 |
| 4,812,268 | 3/1989 | Kamiguchi et al. | 318/632 |
| 4,837,491 | 6/1989 | Fujioka et al. | 318/625 |
| 5,319,294 | 6/1994 | Ohto et al. | 318/568.22 |
| 5,550,449 | 8/1996 | Ege et al. | 318/632 |

FOREIGN PATENT DOCUMENTS 5-91780   4/1993   Japan .

*Primary Examiner*—Jonathan Wysocki
*Attorney, Agent, or Firm*—Sughrue, Mion, Zinn, Macpeak & Seas, PLLC

[57] ABSTRACT

A motor control system for individually feedback-controlling a plurality of servomotors includes: a plurality of motor drive devices for converting DC power into AC power to drive the servomotors; current detecting devices for detecting the current value of the AC current to feed it back to the motor drive devices; and an A/D converter for converting the output signals of the current detecting devices into a digital signal. The motor drive devices, current detecting devices and A/D converter are accommodated in a casing for a group of servomotors, and the output terminals of the current detecting devices in the casing are connected in parallel to the input terminal of the A/D converter, so that the A/D converter is used for all of the current detecting devices in the casing. The resultant motor control system is small in the number of components, and accordingly in the number of wiring conductors, and is simple in construction and accordingly in adjustment work.

14 Claims, 13 Drawing Sheets

51, 55: DEAD TIME FORMING SECTION   52, 56: INVERTER
53: A/D CONVERTER                    54: CURRENT DETECTOR
57: MICROCOMPUTER                    58: ABNORMAL CONDITION DETECTING SECTION 51, 55: DEAD TIME FORMING SECTION
53: A/D CONVERTER
57: MICROCOMPUTER
52, 56: INVERTER
54: CURRENT DETECTOR
58: ABNORMAL CONDITION DETECTING SECTION

60: POSITION CONTROL SECTION  61: SPEED CONTROL SECTION
62: CURRENT CONTROL SECTION  63: PWM SIGNAL GENERATING SECTION
64, 65, 66, 67, 68, 69: SERIAL/PARALLEL CONVERSION SECTION

| | CONVENTIONAL | PRESENT INVENTION |
|---|---|---|
| STRUCTURE | 6 A/D CONVERTERS OF TWO-CHANNEL INPUT AND PARALLEL OUTPUT | 3 A/D CONVERTERS OF FOUR-CHANNEL INPUT AND SERIAL OUTPUT |
| PIN NUMBER OF INVERTER SIGNAL CONNECTORS (34, 35, 36) | 14 | 4 |
| PIN NUMBER OF CONTROL INVERTER I/F CONNECTOR (37) | 19 | 6 |

MOTOR CONTROL SYSTEM WITH SELECTIVELY OPERATED A/D CONVERTOR

BACKGROUND OF THE INVENTION

1. Field of the Invention

This invention relates to a motor control system which is adapted to control the operations of a plurality of servomotors.

2. Related Art

Numerical control systems or positioning systems for controlling industrial robots, machine tools, automated devices, and so forth, employ AC servomotors to position the rotary shafts. The servo-motor is controlled by a motor control device using a servo control system.

FIG. 14 shows an external arrangement of a conventional motor control system for controlling a plurality of servomotors. The motor control system shown in FIG. 14 is for six servomotors. Control units U1 through U6 are provided for the six servomotors, respectively. Those control units U1 through U6 are juxtaposed together with a higher control unit Uh which is adapted to transmit control instructions from an external controller. The control units U1 through U6 and the higher control unit Uh are accommodated in their own casings, respectively, and have a number of electrical wiring connectors and so forth on the front walls.

Those connectors are roughly classified into three kinds of connectors—power wiring connectors, signal line connectors, and motor driving connectors. Each of the control units (for instance the control unit U6) has a serial communication connector 204, a control signal connector 205, an encoder connector 206, a motor drive line connector 207, and a power connector 211. Hence, it is necessary to connect common power source 200 through wires to the power connectors 211 of all the control unite U1 through U6, and to connect servomotors M1 through M6 through wires to motor drive line connectors 207, and to connect encoders E1 through E6 through wires to the encoder connectors 206. In addition, in order to transmit control signals, it is necessary to extend jumper wires 209 from the higher control unit Uh to the control signal connectors 205 of the control units U1 through U6. Furthermore, in each of the control units U1 through U6, wiring must be made for other controls.

FIG. 15 shows a typical example of the control units, namely, the control unit U1. In FIG. 15, a rotational position target value pref of the servomotor M1 is applied through the control signal connector 205 to a position control section 260. In the position control section 260, the rotational position target value pref is compared with a position detection value which is obtained from an encoder signal e1 fed back from the encoder E1, and the difference between them is applied, as a speed instruction s, to a speed control section 261. In the speed control section 261, the speed instruction s is compared with the speed detection value obtained from the encoder signal e1, and the difference between them is applied, as a current instruction i, to a current control section 262. The current control section 262 forms a three-phase instruction v according to a magnetic pole position signal of the servo motor M1 obtained from the encoder signal e1, the current instruction i, and a current detection value Idet fed back from a current detector 258 and an A/D converter 253, and applies it to a PWM signal generating section 263. The PWM signal generating section 263 forms a PWM signal according to the three-phase instruction, and applies it through a dead time forming section 251 to an inverter 252. The latter 252 generates a motor drive voltage according to the PWM signal, to drive the servomotor M1.

The above-described current detector 258 forms a feedback loop to monitor the drive current of the inverter 252 for feedback control, and its output signal is applied to the AD converter 253, where it is subjected to A/D (analog-to-digital) conversion to transmit it to the current control section 262.

In the motor control system, the output of the current detector 258 generally includes an off-set error and gain error, and therefore the current value applied to the servomotor may not be equal to the current instruction value. Unexamined Japanese Patent Publication No. 91780/1993 attempts to overcome this difficulty.

As was described above, in the conventional motor control system, the control units are provided for the servomotors, respectively, and each control unit has the A/D converter. In general, A/D converters are expensive. Hence, the provision of an A/D converter for each of the control units may result in an increase in the manufacturing cost. The conventional A/D converter 253 is of 2-channel input and 12-bit parallel output type. Hence, the resultant motor control system is large in the number of wiring conductors, in the area of the printed circuit board employed therein, and in the number of connector signal pins. All of those factors increases the wiring cost of the conventional motor control system.

On the other hand, the conventional current detector 258 includes an offset error, thus requiring offset adjustment. Heretofore, the adjustment is manually performed using a variable resistor attached to the current detector 258. In addition, the gain control of the current detector 258 is also adjusted manually. Thus, the motor control system is unavoidably high in the cost of adjustment. In order to overcome this difficulty, the aforementioned technique has been disclosed by Japanese Patent Application No. 91780/1993. However, the technique thus disclosed still has another problem to be solved in the operation of gain adjustment or offset adjustment.

SUMMARY OF THE INVENTION

In view of the foregoing, a first object of the invention is to provide a motor control system in which an A/D converter for converting the output signal of a current detector into a digital signal is improved thereby to decrease the number of wiring conductors and simplify the arrangement of the system.

A second object of the invention is to provide a motor control system in which the gain adjustment and offset adjustment of the current detector can be achieved with ease, and its control operation is high in reliability, According to an aspect of the present invention, there is provided a motor control system for individually feedback-controlling a plurality of servomotor comprising motor drive means for converting DC power into AC power and applying said AC power to said plurality of servomotors; current detecting means for detecting the current value of said AC current to feed back the current value thus detected to said motor drive means; and A/D converter means for converting an output signal of said current detecting means into a digital signal, wherein at least two of said plurality of servomotors form a unitary group and, said motor drive means, said current detecting means and said A/D converter means are accommodated in a casing for every said unitary group, and said A/D converter means is a converter of multi-channel input and serial output type to which output signals of said current detecting means are applied.

wherein the number of said output signal corresponds to the number of said servomotors forming said unitary group, and in which output signals of said current detecting means are selectively subjected to analog-to-digital conversion.

A motor control system for individually feedback-controlling a plurality of servomotor comprisees a plurality of motor drive means for converting DC power into AC power to drive the servomotors; current detecting means for detecting the current value of the AC current to feed it back to the motor drive means; and an A/D converter for converting the output signal of the current detecting means into a digital signal.

In the system, the motor drive means, current detecting means and A/D converter are accommodated in a casing for every plural servomotors, and the output terminals of the plurality of current detecting means in the casing are connected in parallel to the input terminal of the A/D converter, so that the A/D converter is used for all of the current detecting means in the casing. Thus, the resultant motor control system is small in the number of components, and accordingly in the number of wiring conductors, and is simple in construction and accordingly in adjustment work.

BRIEF DESCRIPTION OF THE DRAWING(S)

DETAILED DESCRIPTION OF THE PREFERRED EMBODIMENTS

One preferred embodiment of the invention will be described with reference to the accompanying drawings.

(I) Fundamental Structure of the Motor Control System

Figure 1:
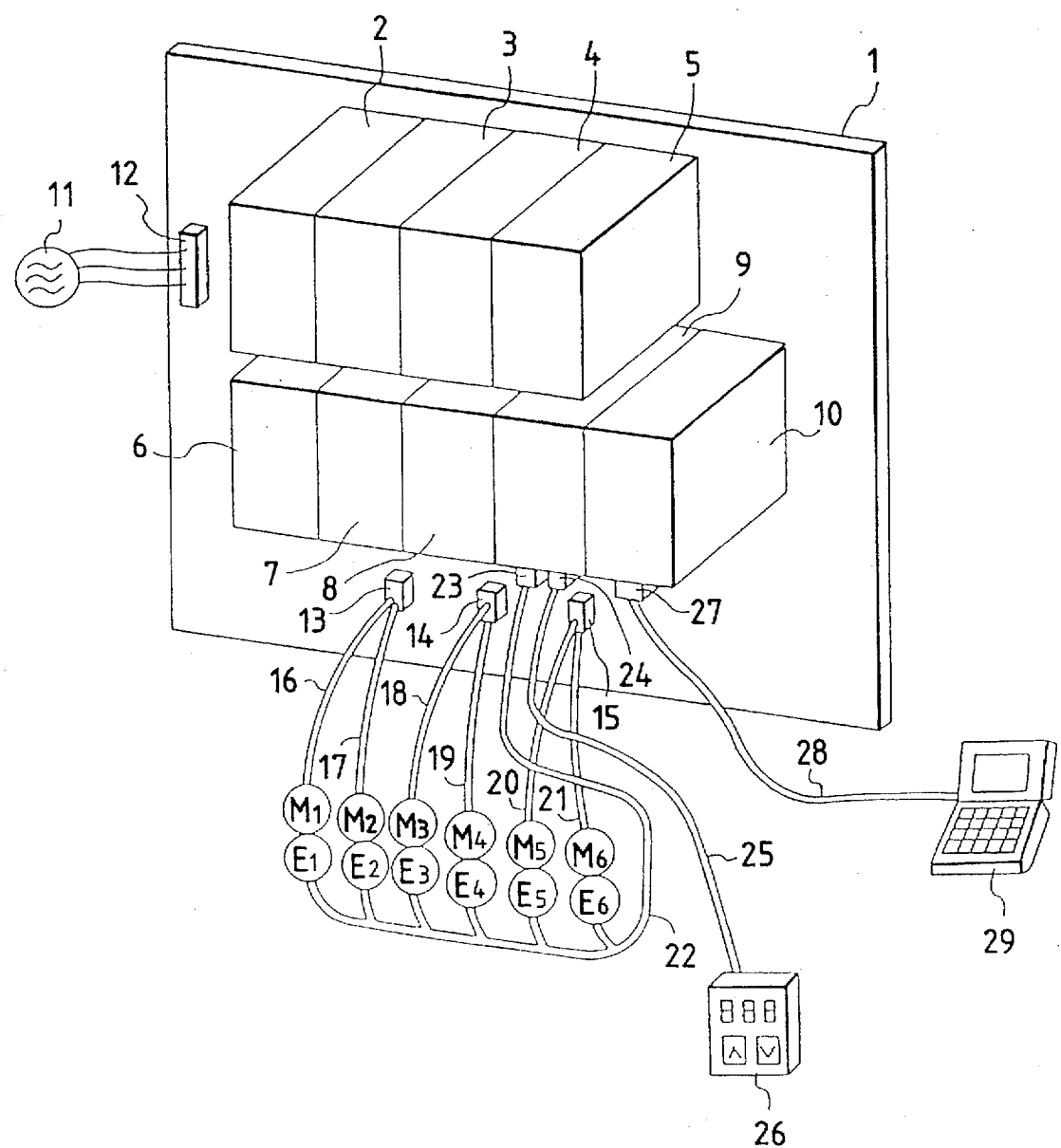
FIG. 1 is an external perspective view outlining the arrangement of various units forming a motor control system according to the invention.

FIG. 1 shows a fundamental arrangement of a motor control system according to the invention.

As shown in FIG. 1, a back plain board 1 is held vertical which includes a circuit board which is formed using a glass epoxy resin plate. On the front surface of the back plain board 1, elements 2, 3, 4 and 5 (described later) are fixedly mounted in a line, and elements 6, 7, 8, 9 and 10 (described later) are also fixedly mounted in a line below the elements 2 through 5. Those elements 1 through 10 are functional element units which are different in function (or operation) from one another.

That is, the functional element units arranged in the upper line are main circuit power means 2 for converting AC power into DC power, additional capacitor units 3 and 4, and a small signal power unit 5. On the other hand, the functional elements arranged in the lower line are: biaxial inverter units 6, 7 and 8 for controlling two motors, a higher control unit 9, and a lower control unit 10 for six motors. On the rear surface of the back plain board 1 (end on the front surface when necessary), a printed circuit board is provided in which circuit patterns have been printed which are necessary for formation of the motor control system according to the invention.

On the front surface of the back plain board 1, a power connector 12 is provided near the arrays of the functional element units 2 to 10, and it is connected to a power cable from the commercial power source 11. Power line connectors 13, 14 and 15 are provided below the array of the functional element units 6 through 10, and are connected through motor wires 16 through 21 to servomotors M1 through M6. An encoder connector 23, and a serial communication connector 24 are mounted on the bottom of the lower control unit 9. The encoder connector 23 is connected to ends of an encoder lanes 22 provided for the six encoders. The serial communication connector 24 is connected through a communication line 25 to an external setting device 26 such as a control parameter setting unit. The mounting of the encoder connector 23 and the serial communication connector 34 on the lower control unit 9 instead of the back plain board I provides the following merit; That is, the number of wires between the connecting connectors 37 and 41 and the back plain board 1 (as described later).

Similarly, a serial communication connector 27 is mounted on the bottom of the upper control unit 10. The connector 27 is connected through a communication line 28 to an externally set device such as a personal computer or teaching pendant.

Figure 2:
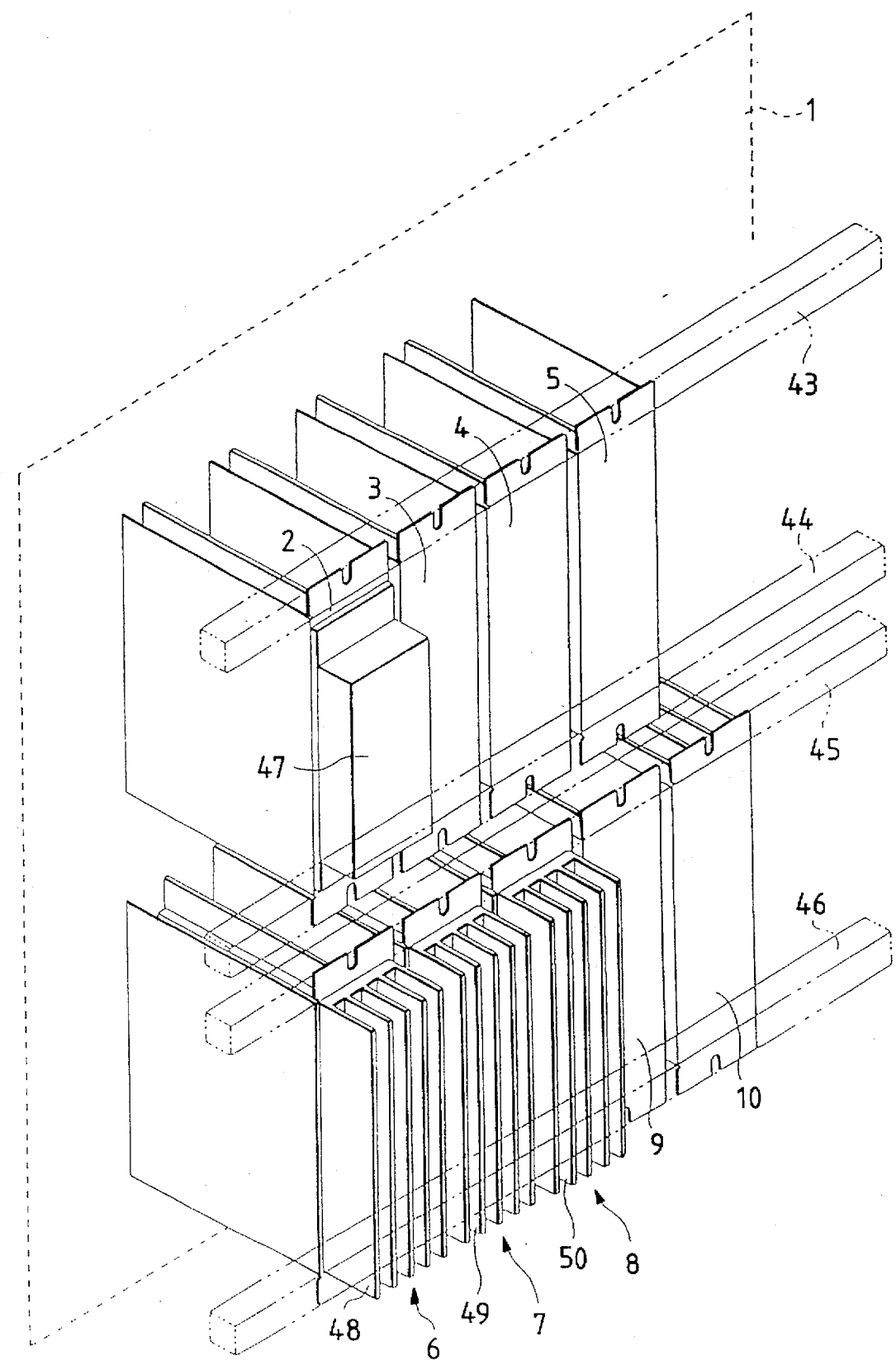
FIG. 2 is an external perspective view showing the structures of those units in detail.

FIG. 2 shows the construction of the above-described functional element units. As shown in FIG. 2, a pair of upper and lower supporting frames 43 and 44 are provided on the front surface of the back plain board 1 in such a manner that they are spaced away from the back plain board 1 in correspondence to the depth of the functional element units 2 through 5 and are spaced from each other in correspondence to the vertical length of them. Similarly, another pair of upper and lower supporting frames 45 and 46 are provided on the front surface of the back plain board 1 in such a manner that they are spaced away from the back plain board 1 in correspondence to the depth of the functional element units 6 through 10 and are spaced from each other in correspondence to the vertical length of them. That is, between the upper supporting frames 43 and 44, the main circuit power unit 2, the additional capacitor units 3 and 4, and the small signal power unit 5 are detachably mounted for convenience in maintenance. Similarly, between the lower supporting frames 45 and 46, the biaxial inverter units 6, 7 and 8, the lower control unit 9, and the higher control unit 10 are detachably mounted.

A regenerative resistor 47 is mounted on the front surface of the main circuit power unit 2. The regenerative resistor 47 is to consume and absorb the regenerative power which is generated in a servomotor when a deceleration instruction is applied to the servomotor. The reason why the regenerative resistor 47 is mounted on the front side of the main circuit power unit 2 which is opposite to the back plain board 1 (in the unit mounting direction) is that, since the regenerative resistor 47 is a heat generating source during operation, it is necessary to protect the internal circuit from being thermally affected by the internal regenerative resistor 47.

On the front surfaces of the biaxial inverter units 6, 7 and 8, cooling fin assemblies 48, 49 and 50 are provided in such a manner that they are protruded from those units 6, 7, and 8, respectively. The cooling fin assemblies 48, 49 and 50 are used to radiate heat from power devices such as power transistors in inserters 52 and 56 (described later) provided in the biaxial inverter units 6, 7 and 8. In order to improve the heat radiating efficiency of the fin assemblies 48, 49 and 50, it is desirable that their fins (blades) are extended vertically.

As was described above, the cooling fins 48, 49 and 50 are provided protruded from the casings of the respective biaxial inverter units 6, 7 and 8, due to the facts that the cables are eliminated from the front surface of the back plain board, and the functional elements units 2 through 5 and the functional elements 6, 7 and 8 are laid collectively in two lines. The cooling fin assemblies 48, 49 and 50 are extended outside from the respective casings 6, 7 and 8. Hence, heat will never be held inside the casings. This feature prevents the internal circuits from being thermally affected, eliminating unwanted factors such as temperature drift which make the circuits unstable during operation. Thus, the motor control system of the invention is high in reliability.

As was described above, the cooling fin assemblies 48, 49 and 50 of the biaxial inverter units 6, 7 and 8, the main circuit power unit 2, and the regenerative resistor 47 are arranged before as viewed in the direction of insertion of the units; that is, they are provided on the side which is opposite to the side where the electrically wiring (connecting) base-board-side connectors are provided. This is due to the fact that, on the front side, the cables are eliminated, and the circuit wiring is performed on the back plain board 1 on the rear side.

Figure 3:
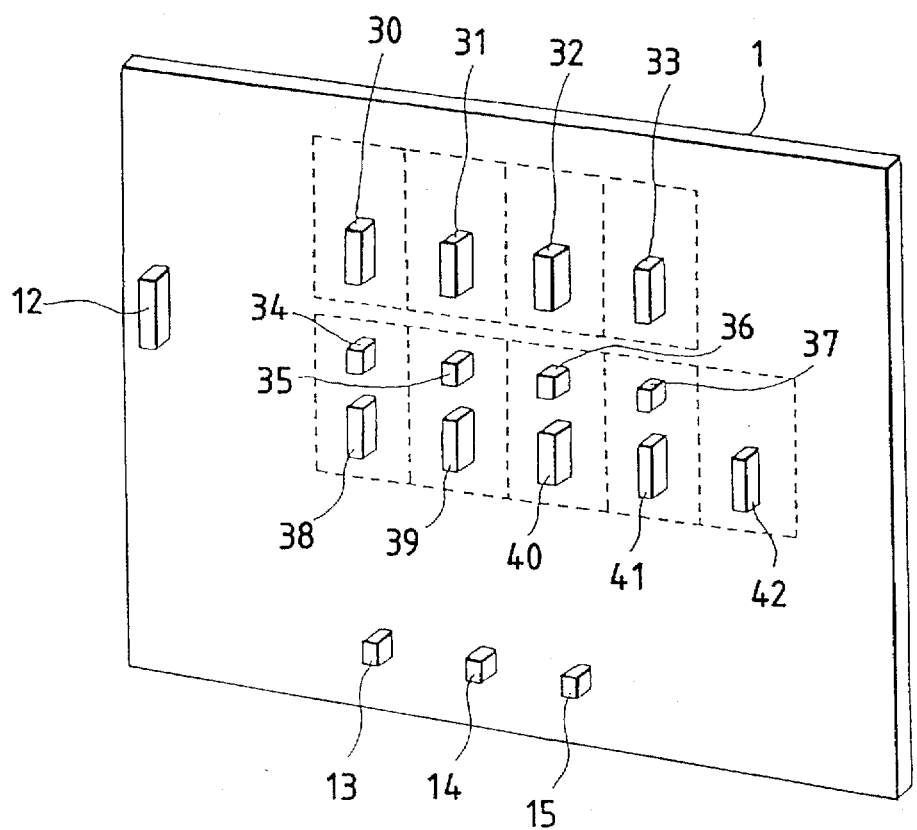
FIG. 3 is an external perspective view showing a variety of connectors mounted on a back plain board in the motor control system of the invention.

FIG. 3 shows connectors mounted on the back plain board 1. As shown in FIG. 3, on the rear surface of the back plain board 1, base-board-side connectors 30 through 42 are provided in correspondence to the units 2 through 10, so that they are threadably engageable with unit-side connectors (not shown) provided on the rear of those units 2 through 10.

The units 2 through 10 are fixedly mounted on the back plain board 1 as follows: The units 2 through 10 are inserted into the back plain board 1 from the front, and engaged with the upper supporting frames 43 and 44, and the lower supporting frames 45 and 46 with screws. Thus, the unit-side connectors of the units 2 through 10 are engaged with the base-board-side connectors 30 through 42, respectively. Predetermined printed circuit layers have been formed on the back plain board 1, so that the wiring of the motor control system is completed.

(II) Arrangement and Connection of the Functional Element Unit

Figure 4:
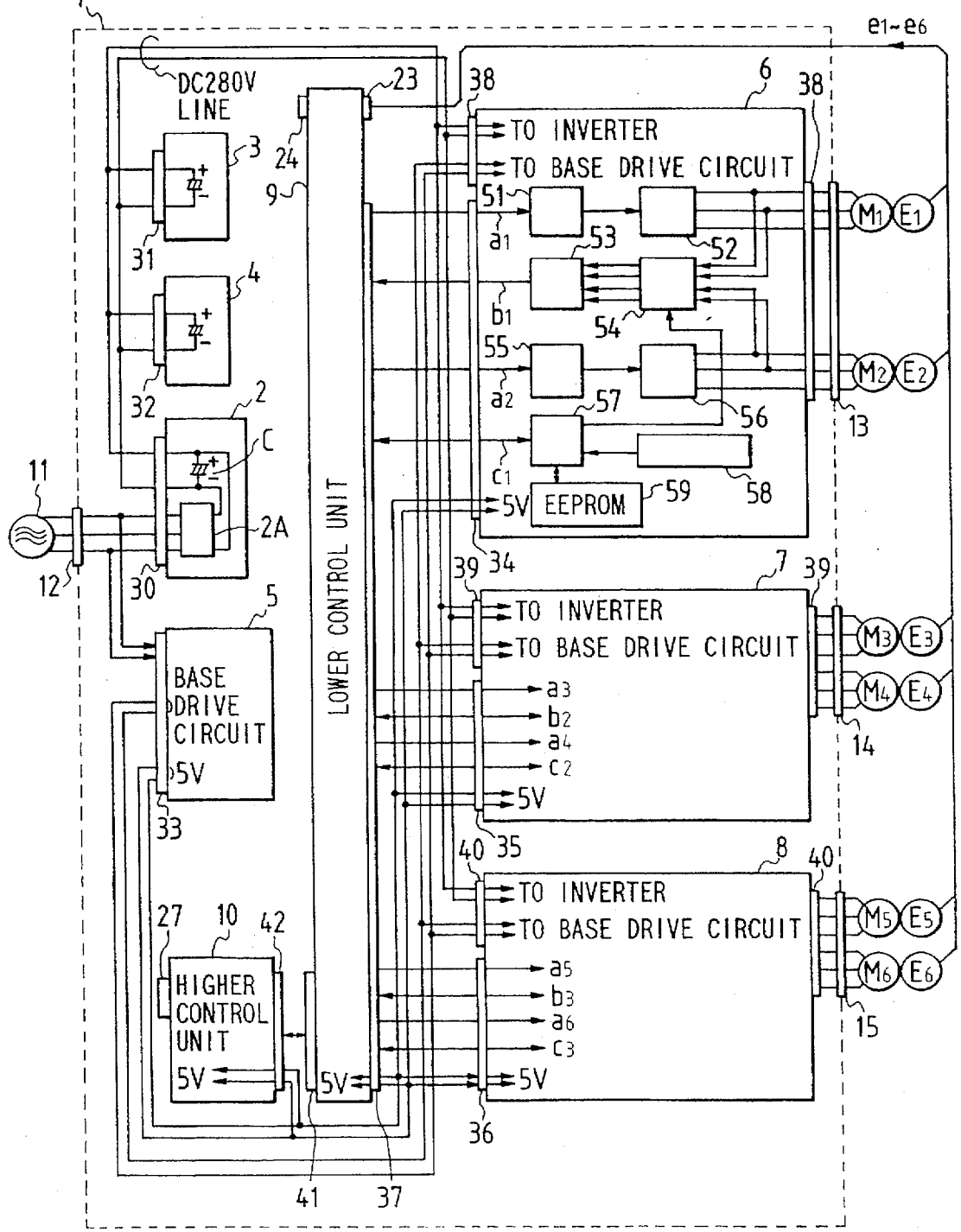
FIG. 4 is a block diagram for a description of the arrangement and connection of the units in the motor control system of the invention.

FIG. 4 shows the arrangements of the functional element units, and the connection of those units. The positions of the functional element units 2 through 10 on the back plain board 1 are not correspondent to those in FIG. 1; that is, FIG. 4 merely shows the electrical connection of them.

As shown in FIG. 4, the functional element units 1 through 10 are electrically connected to one another through base-board-side connectors 30 through 42. For this purposes, the wiring circuit layers printed on the back plain board are utilized.

Now, each of the functional element units will be described in detail. The motor control system can be roughly divided into two system circuits; namely, a large power system circuit, and a small signal system circuit.

First, the large power system circuit will be described. Three-phase AC power (for instance, of AC 200V) from the commercial power source 11 is applied to the main circuit power unit 2 through the power connector 12.

The unit 2 includes a converter 2A for converting three-phase AC power into DC power, and a capacitor C for removing ripple components from the rectified output; i.e., for smoothing the latter. The converter 2A is, for instance, made up of a diode-connected three-phase bridge rectifier circuit, a regenerative resistor for consuming regenerated power, and a switching (on-off) circuit for the regenerative resistor. The obtained DC power (for instance DC 280V) is applied, as high voltage, through the additional capacitor units 3 and 4 and the inverter large current connectors 38, 39 and 40 to the biaxial inverter units 6, 7 and 8.

The additional capacitor units 3 and 4 are so designed that, in the case where the smoothing capacitor becomes inadequate in capacitance when the drive capacity for the motor control system of the invention is changed in specification, they supplement the capacitance without delay.

The DC power applied to the biaxial inverter units 6, 7 and 8 is applied to inserters 52 and 56 (which are provided in each of the units 6, 7 and 8), to drive the servomotors M1 through M6. (The arrangements of the inserters 52 and 56 will be described later.)

The small signal power unit 5 is a low voltage source. It includes a 5V power source for the base drive circuits of power transistors forming the aforementioned inserters 52 and 56, and for small signal system units (described later). More specifically, it is made up of a constant voltage power unit such as a switching regulator.

An external control signal from the external setting device 29, which is a circuit of the small signal system, is applied through the serial communication connector 27 to the higher control unit 10. The latter 10 is to transmit the external control signal to the lower control unit 9; that is, it is a control unit higher in operating order than the lower control unit 9.

(III) Lower Control Unit (Six-axes Control Unit)

The lower control unit 9 operates as follows: That is, it operates in response to an external control signal from the upper control unit 10, a control parameter setting signal applied thereto through the communication line 28 (cf. FIG. 1) and the serial communication connector 24, encoder signals e1 through e6 from the encoders E1 through E6 which are fed back through the encoder connector 23, PWM signals a1 through a6, current serial signals b1 through b6, or other internal correcting signals, and according to a control program stored in an EEPROM 107, thereby to perform feedback control of the biaxial inverter units 6, 7 and 8; that is, servo-control of the latter as a whole. That is, the servo motors M1 through M6 (six axes) are all controlled by the lower control unit 9; i.e., by the servo-controlling unit.

Figure 5:
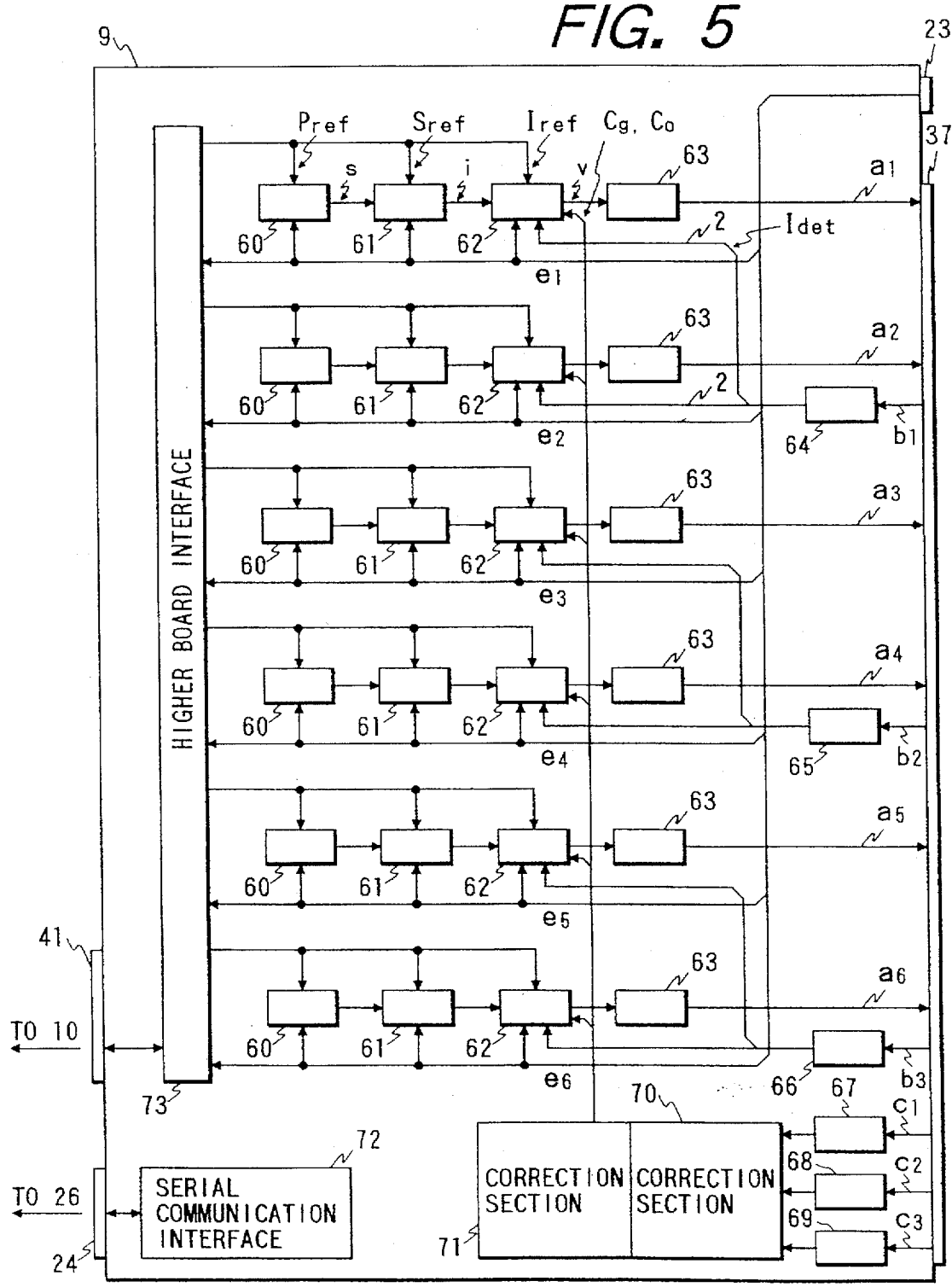
FIG. 5 is a block diagram showing an example of the arrangement of a lower control unit.

FIG. 5 is a diagram showing the functional sections of the lower control unit 9 in detail. The lower control unit 9 has six (6) control loops for the servomotors M1 through M6; however, for simplification in description, a typical one (for the first axis) will be described.

One (each) motor control loop has a position control section 60, a speed control section 61, a current control section 61, and PWM signal generating section 63. An SP (Serial/Parallel) conversion section 64 is used by two control loops. For each of the six axes, the upper control unit 10 applies a uniaxial position target value Pref, a uniaxial speed target value Sref., and a uniaxial current target value Iref respectively to the position control section 60, the speed control section 61, and the current control section 62 through an higher board interface 73.

On the other hand, the encoder signals e1 through e6 are applied to the position control section 60, the speed control section 61, and the current control section 62 through the encoder connector 23. A current detection value Idet is applied through the SP conversion section 64 to the current control section 62.

The position control section 60 compares the aforementioned uniaxial position target value Pref with a uniaxial position detection value Pdet which is obtained from the encoder signal e1 by conversion, and outputs the difference between them. The difference is applied, as a speed instruction s, to the speed control section 61. In the latter 61, the speed instruction is compared with a uniaxial speed detection value Sdet which is obtained from the encoder signal e1 by conversion, to provide a difference between them, and forms a current instruction i according to the difference thus provided and to the speed target value Sref. The current instruction i is applied to the current control section 62. In the current control section 62, a current amplitude instruction value is obtained by addition of the uniaxial current target value Iref and the current instruction i, and the current amplitude instruction value thus obtained is converted into a two-phase current instruction value according to a motor magnetic pole position obtained from the encoder e1, and forms a uniaxial three-phase voltage instruction v according to a current detection value Idet, a gain correction data Cg and an off-set correction data Co which are from a correction section 71. The uniaxiel three-phase voltage instruction v is applied to the PWM signal generating section 63. The PWM signal generating section 63 forms a PWM (pulse width modulation) signal al according to the instruction v, and applies it to the biaxial inverter unit 6 through a control inverter I/F connector 37. The correction section 71 is detection error correcting means for a current detector 54 (described later). The means produces the gain correction data Cg, and the off-set correction data Co, on the basis of the parallel data which are obtained by converting the microcomputer serial signals c1 through c3 from microcomputers 57 with the aid of SP conversion sections 67, 68 and 69.

Figure 6:
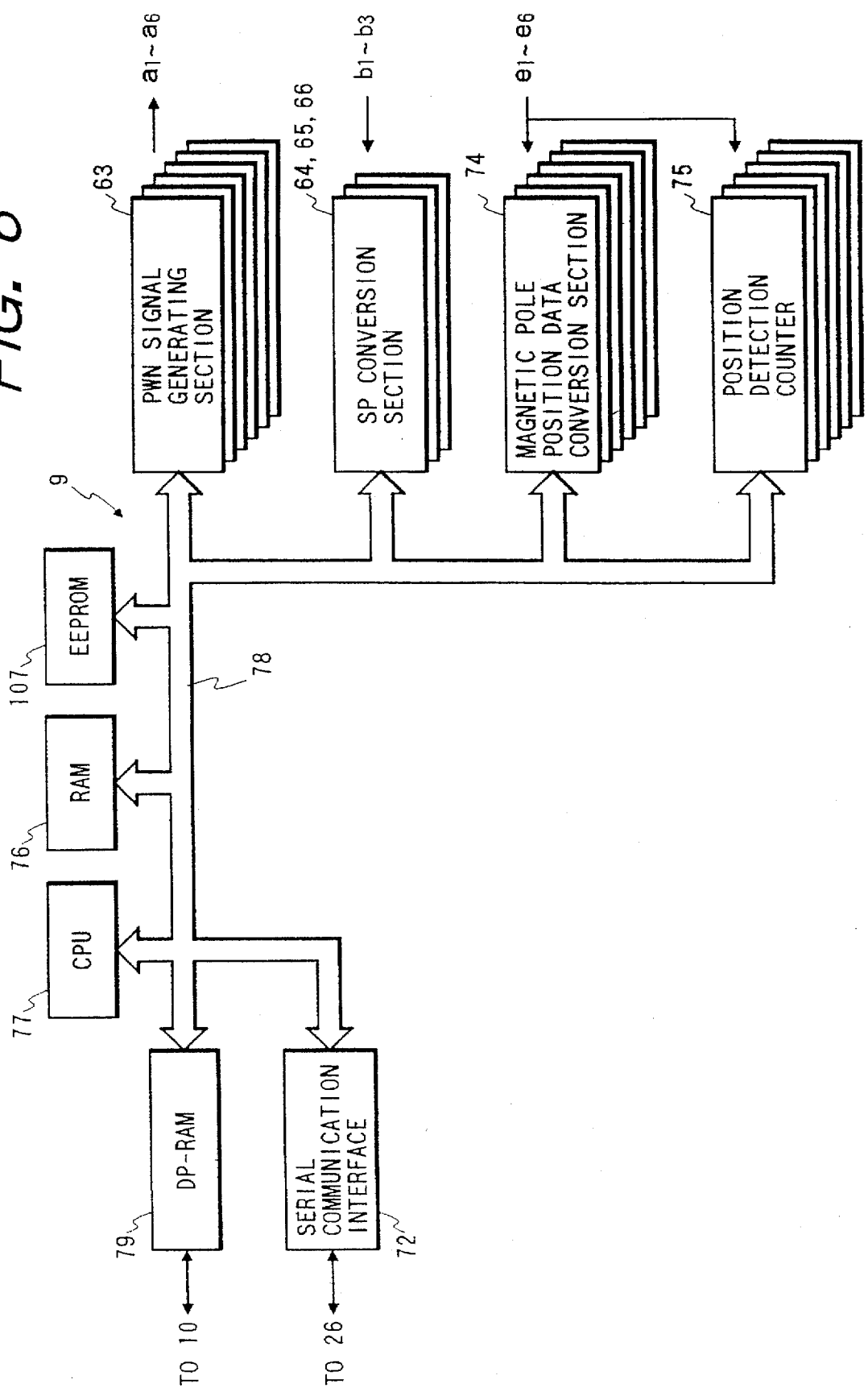
FIG. 6 is a block diagram showing an example of the arrangement of hardware in the lower control unit.

FIG. 6 shows an example of the arrangement of the lower control unit 9. The unit 9 comprises; a CPU 66 for controlling the unit 9 as a whole; a RAM 76; an EEPROM (or flash memory) 107; a DP-RAM (or dual-port RAM) 79, the serial communication interface 72; the PWM signal generating sections 63; SP conversion sections 64 through 66; the magnetic pole position data conversion sections 74, and the position detection counters 75, all of which are connected to one another through buses 78. The DP-RAM 79 serves as a data buffer for transmission of data from and to the higher control unit.

Figure 7:
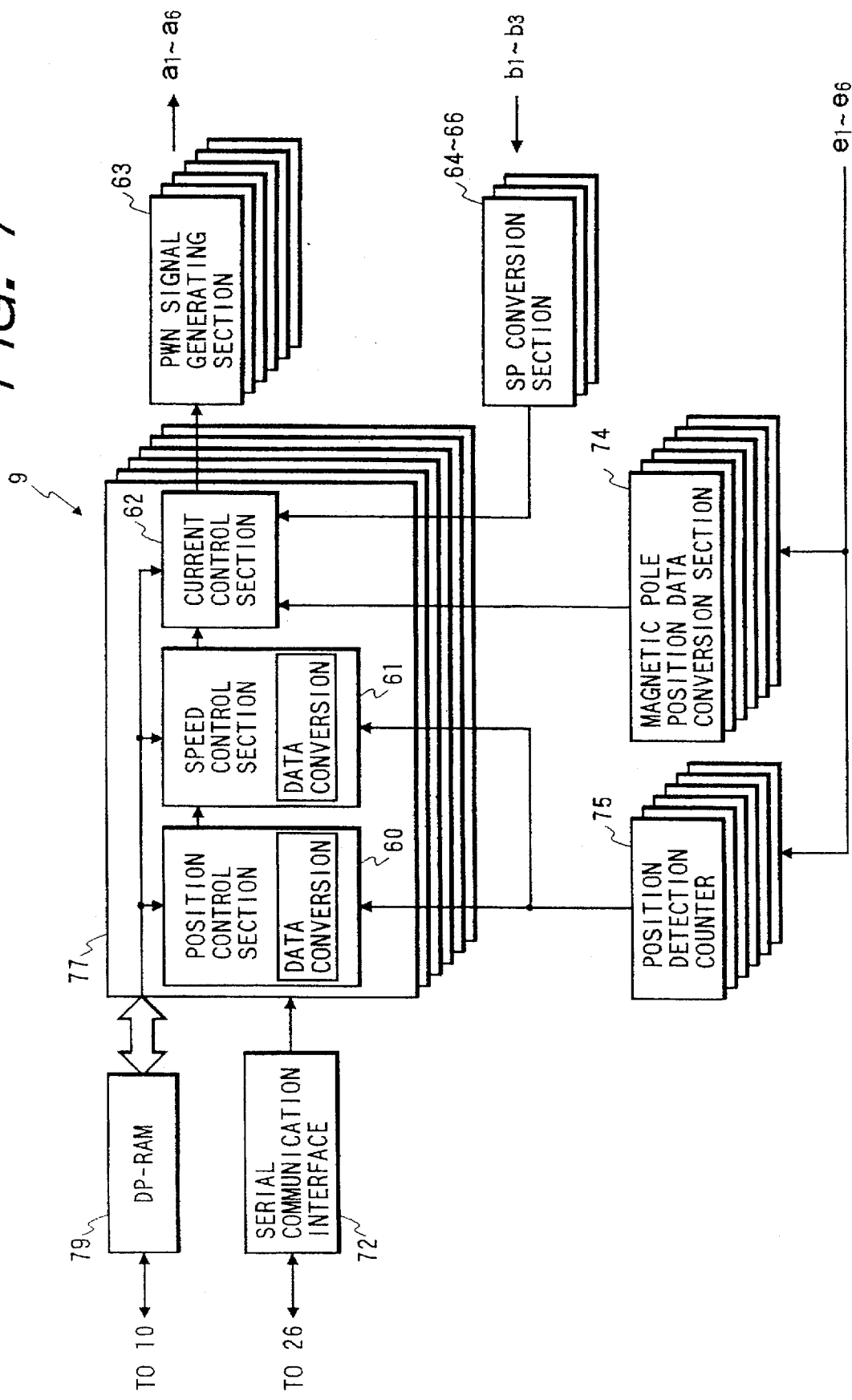
FIG. 7 is a block diagram showing an example of the operation performed by a CPU in the lower control unit.

FIG. 7 is a diagram for a description of the operations of the CPU 77 in the lower control unit 9. As shown in FIG. 7, the position control section 60, the speed control section 61, and the current control section 62 (which are all shown in FIG. 5), are all operated by the CPU 77 at high speed in time-sharing mode.

(IV) Biaxial Inverter Units

As conducive to a full understanding of the invention, the biaxial inverter units 6, 7 and 8 will be described again with reference to FIG. 4. Those biaxial inverter units 6 through 8 are equal in structure to one another. Hence, for simplification in description, only the unit 6 will be described as a typical one.

The biaxial inverter unit 6 includes inserters for two servomotors M1 and M2. In the embodiment, the unit 6 is for two axes; however, the invention is not limited thereto or thereby; that is, in general, it may be designed for A (plural) axes. The reason why one inverter unit includes a plurality of inserters is to simplify the circuitry and to reduce the manufacturing cost.

As shown in FIG. 4, the output PWM signal al of the lower control unit 9 is applied to a dead time forming section 51. The section 51 is provided for the following purpose: When, in the inverter adapted to convert DC power into three-phase AC power, a pair of power transistors connected in direct to one phase wherein are rendered conductive (on) at the same time, a through current may flow. In order to prevent that through-current, the dead time forming section 51 is provided. The output of the dead tame forming section 51 is applied to the inverter 52.

As was described above, the inverter 52 is a power inverter for converting DC power into three-phase AC power, and it is generally formed by connecting power transistors in a three-phase bridge form. The three-phase AC power outputted by the inverter 52 is applied through the inverter large current connector 38 and the power line connector 13 and through the motor wire 16 (FIG. 1) to the motor M1. Similarly, a PWM signal a2 from the lower control unit 9 is applied to a dead time forming section 55, and the output of the latter 55 is applied to the inverter 56. The three-phase AC power outputted by the inverter 56 is applied through the inverter large current connector 38 and the power line connector 13 and the motor wire 17 (FIG. 1) to the servomotor M2.

Now, a drive current detection feedback loop in the biaxial inverter unit 6 will be described. The feedback loop may be outlined as follower Two of the three-phase outputs of the inverter 52, and two of the three-phase outputs of the inverter 56 are connected to a current detector 54, so that the output drive currents of the inverters 52 and 56 are monitored. The current detector 54, being provided for both the inverters 52 and 56, is to detect the current values of AC powers supplied to the inverters 52 and 56. The current detection gain of the current detector 54 can be changed with a switch signal from the microcomputer 57. The current detection value of the current detector 54 is converted into a digital signal by an A/D (analog-to-digital) converter 53 of multi-channel input and serial output type, which is applied to the SP conversion section 64 of the lower control unit 9. The above-described 54, A/D converter 53, and SP conversion section 64 form a feedback loop for the inverters 52 and 56.

(V) Current Detector

Figure 8:
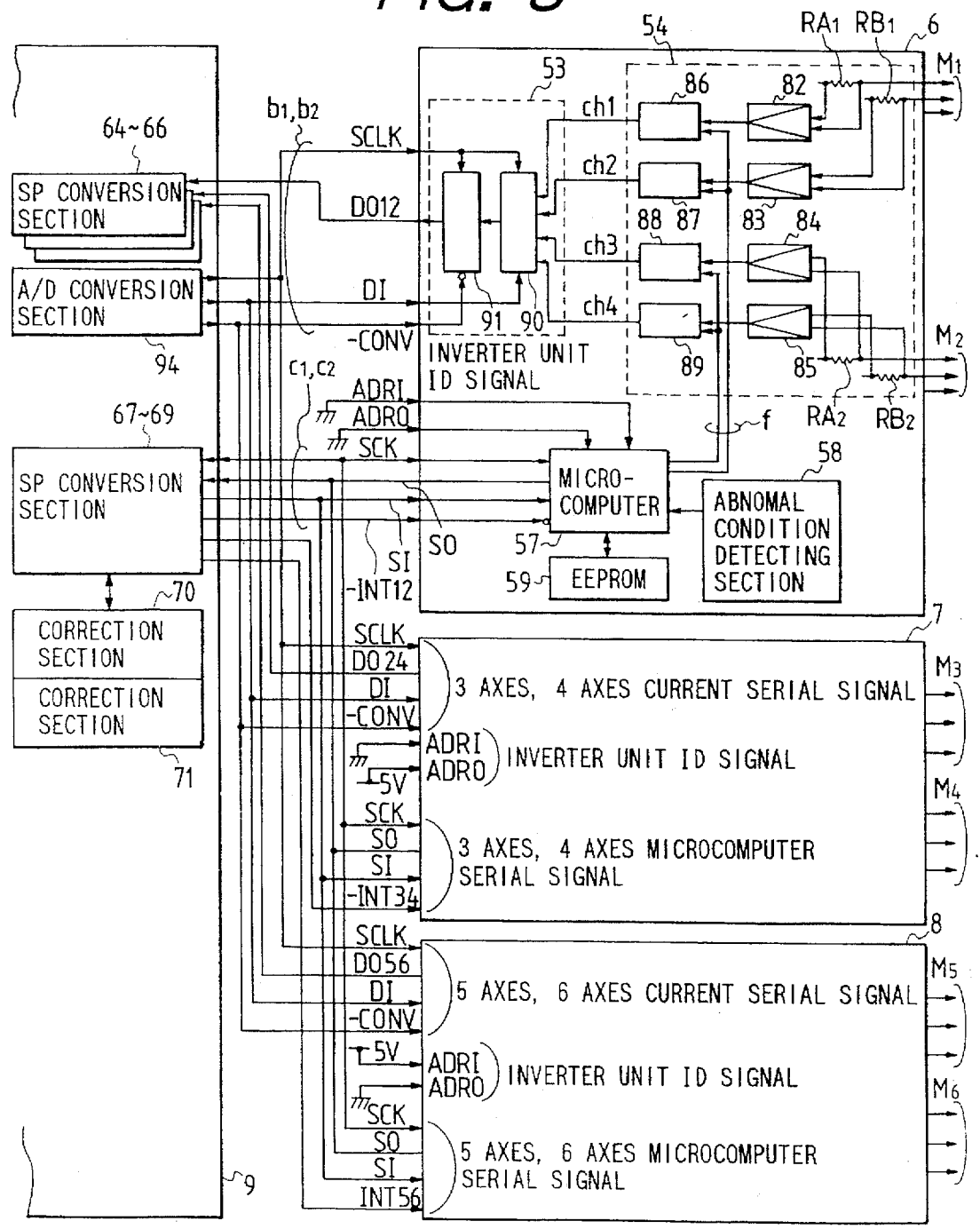
FIG. 8 is a block diagram showing circuits pertaining to current detectors in a biaxial inverter unit.

FIG. 8 is a circuit diagram, partly as a block diagram, showing the A/D converter 53 and the current detector 54 in the biaxial inverter unit 6, and their connection to the lower control unit 9. As shown in FIG. 8, current detecting resistors RA1 and RB1 are connected in the output wires of the inverter 52. The voltage across the current detecting resistor RA1 is applied, as a drive current detection signal of a first phase ("A" phase) of the inverter 52, to an insulating amplifier 82; while the voltage across the current detecting resistor RB1 is applied, as a drive current detection signal of a second phase ("B" phase) of the inverter 52, to another insulating amplifier 83. Similarly, current detecting resistors RA2 and RB2 are connected in the output wires of the inverter 56. The voltage across the current detecting resistor RA2 is applied, as a drive current detection signal of a first phase ("A" phase) of the inverter 56, to an insulating amplifier 84; while the voltage across the current detecting resistor RB2 is applied, as a drive current detection signal of a second phase ("B" phase) of the inverter 56, to an insulating amplifier 85.

The insulating amplifiers 82 through 85 are to electrically insulate the output wires of the great power system inserters 52 and 56 from the feedback loop small signal system. Those insulating amplifiers 82 through 85 are of electro-optical/or opto-electrical conversion, or electro-magnetic/or magneto-electrical conversion. The output signals of the insulating amplifiers 82 through 85 are applied to variable gain amplifiers 86 through 89.

The variable gain amplifiers 86 through 89 are made up of operational amplifiers so that they are operable even in the case where the operating specification is changed—for instance when the servomotors M1 through M6 different in rating (for instance, 5A and 10A motors) are used. That is, when, in the prior art (FIG. 14), the servomotors M1 through M6 are changed with ones different in rating, it is necessary to replace the motor control devices U1 through U6 in accordance with the ratings of the new servomotors M1 through M6, and in addition it is necessary to connect the cables 201, 209 and 210 all over again. However, in the embodiment of the invention, the additional capacitor units 3 and 4 (cf. FIGS. 1 and 4) are detachably installed, and the variable gain amplifiers 86 through 89 are employed. This feature makes it unnecessary to modify the motor control system even when the servomotors are changed.

Figure 9:
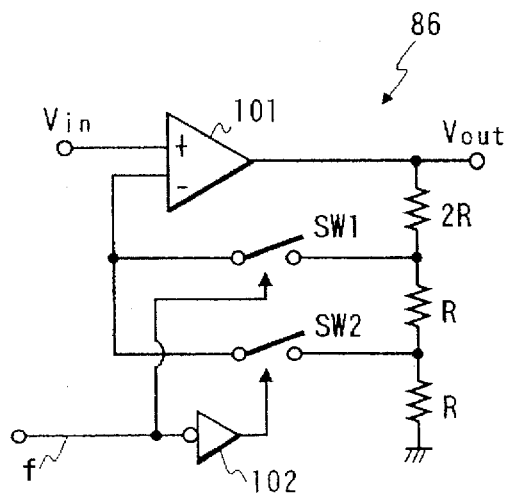
FIG. 9 is a circuit diagram, partly as a block diagram, showing an example of a variable gain amplifier in the biaxial inverter unit.

FIG. 9 shows an example of the variable gain amplifier 86 (the remaining variable gain amplifiers 87 through 89 being equal to the amplifier 86). As shown in FIG. 9, the variable gain amplifier 86 is so designed that the gain; i.e., the degree of amplification of an operational amplifier 101 is adjusted by changing the feedback resistance (2R, R and R) of the operational amplifier with switches SW1 and SW2. Those switches SW1 and SW2 may be analog switches which may be operated with a gain switching signal f from the microcomputer 57. In the circuit shown in FIG. 9, the gain is switched in two steps; however, it goes without saying that it can be switched in more than two steps. When the gain switch signal f is at a logic level "1", the switch SW1 is turned on; and when it is a logic level "0", the switch SW2 is turned on.

(VI) A/D Converter

As shown in FIG. 8, the A/D converter 53 is made up of an A/D converter of 4-channel input and serial output type, and is used for the inserters 52 and 56. As shown in FIG. 8, the AD converter 53 comprises an input switch section 90 and an A/D conversion section 91. The input switch section 90 is a selector to selectively transmit four-channel current detection value signals to the A/D conversion section 91. That is, it applies one of the four-channel current detection value signals to the A/D conversion signal 91 in synchronization with a clock signal SCLK in response to an instruction signal DI from the A/D conversion control section 94. The A/D conversion section 91 converts the current detection value signal into a digital signal in synchronization with the clock signal SCLK in response to a strobe signal -CONV from the A/D conversion control section 94. The current detection value signal DO12 thus converted is applied to the SP conversion section 64 of the lower control unit 9. The serial current detection value signal DO12 is to transmit a first axis current detection value and a second axis current detection value in a time-sharing mode; that is, it is not for transmit the two current values simultaneously.

Figure 12:
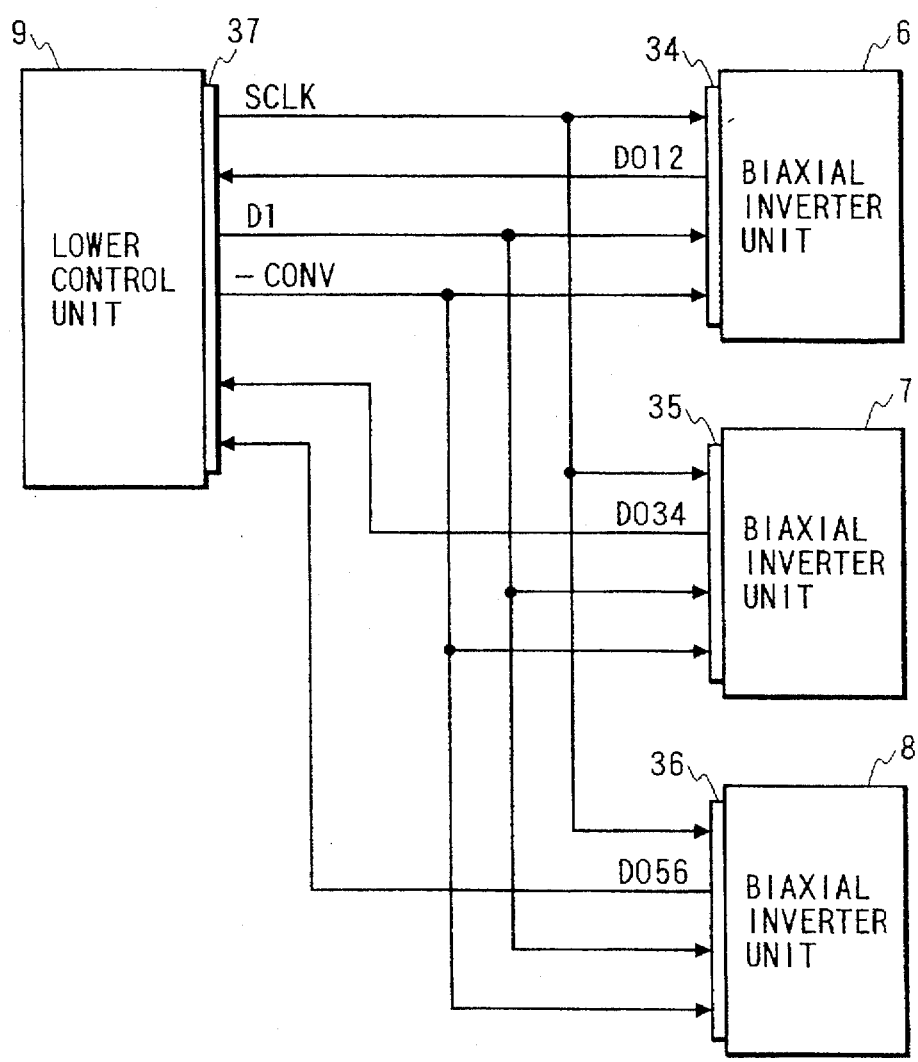
FIG. 12 is a block diagram showing the wiring of the lower control unit to the biaxial inverter units.

As was described above, for A/D conversion of biaxial current detection values, the A/D converter 53 of four-channel input and serial output type is employed, and it is for double axis. Hence, as shown in FIG. 12, as for six axes, the number of signal lines can be reduced to six, and accordingly the number of pins is decreased to six. That is, the number of signal lines is reduced, and the connectors can be miniaturized, and the biaxial inverter unit 6 itself can be miniaturized.

Figures 13, 14:
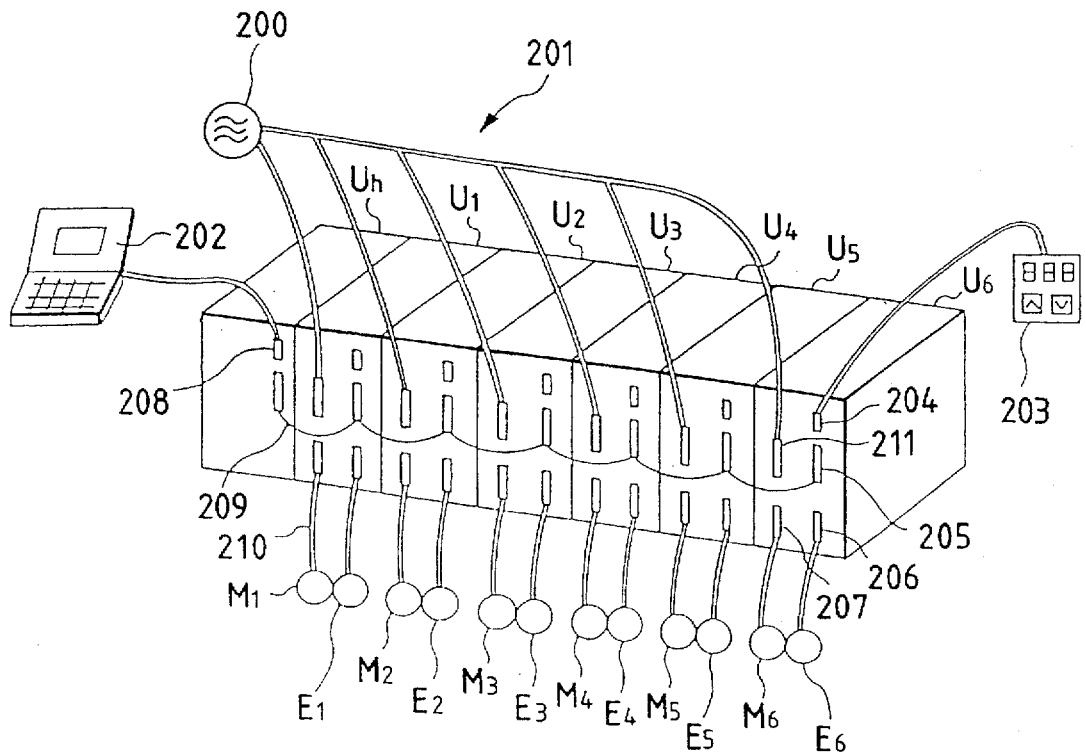
FIG. 13 is an explanatory diagram showing the comparison between the prior art and the present invention in the number of connector signal pins between the lower control unit and the biaxial inverter units.
FIG. 14 is an external perspective view showing an example of the arrangement of a conventional motor control system.
Figure 15:
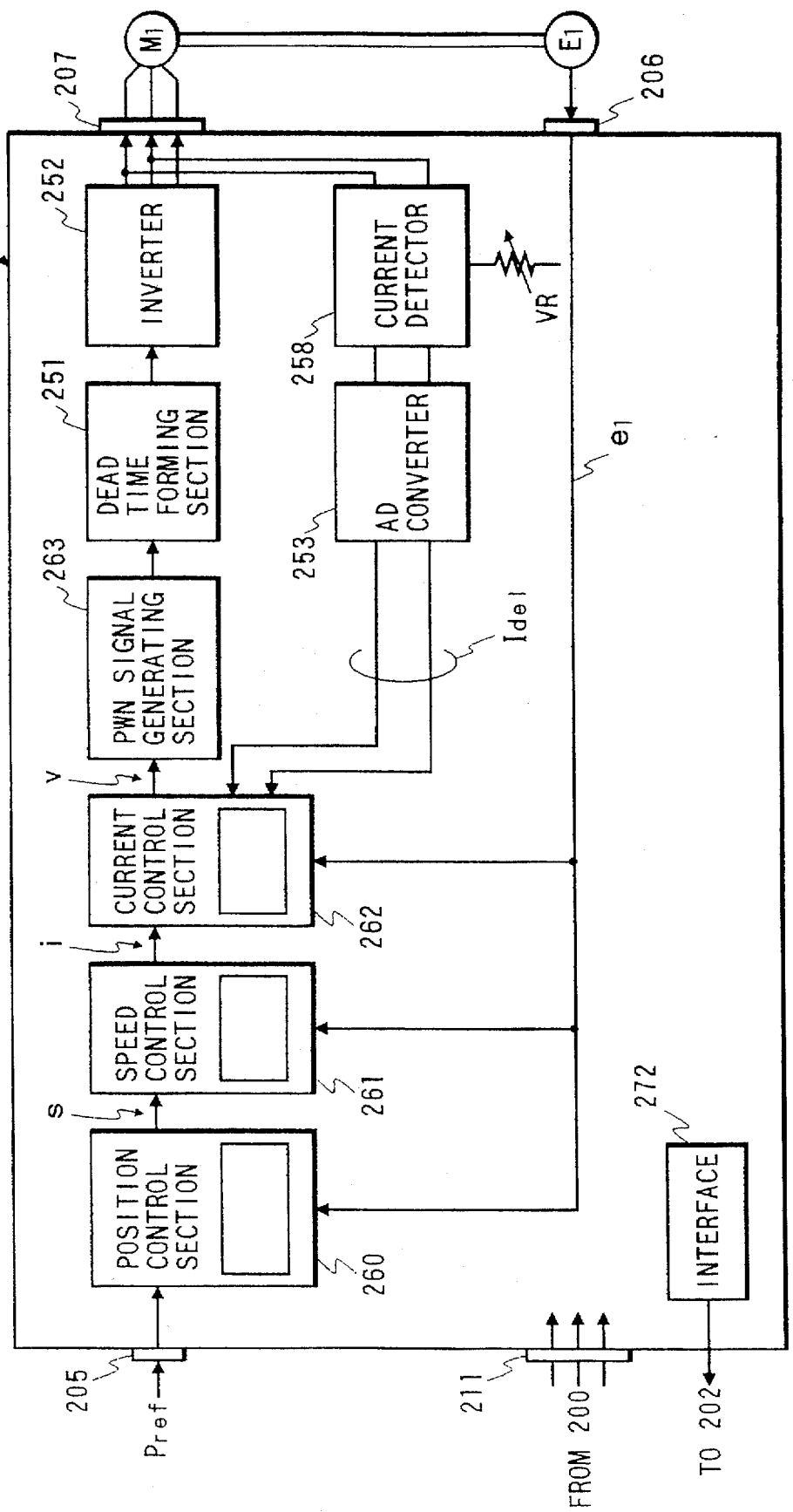
FIG. 15 is a block diagram showing an example of the arrangement of a control unit per axis in the conventional motor control system.

The differences in the number of signal pins between the prior art and the embodiment of the invention are as indicated in FIG. 13. In the prior art, each inverter employs the A/D converter of 2-channel-input and 12-bit-parallel-output type. That is, in the prior art, as for the six axes in total, at least nineteen (19) signal lines must be connected to the lower control unit 9 (which is the sum of 12 (A/D converter output lines) +1 (channel switch signal line) +6 (A/D converter selecting signal lines)), and accordingly nineteen (19) signal pins must be provided in correspondence to the number of signal lines.

(VII) CURRENT DETECTOR OFFSET CORRECTION AND GAIN CORRECTION

In changing the gains of the variable gain amplifiers 86 through 89 shown in FIG. 8, in order to maintain the control accuracy high it is essential to calibrate the gains in accordance with the rated currents of the motors in use. One of the error characteristics of an operational amplifier is an offset characteristic. Different operational amplifiers have different offset characteristics. Heretofore, the offset correction is performed by manually operating a variable resistor attached to the amplifier; however, the manual correction is unavoidably low in work efficiency.

In order to overcome this difficulty, the lower control unit 9 is provided with correcting means which automatically and digitally perform the gain correction and the offset correction in changing the gains of the current detectors 54 in the biaxial inverter units 5, 7 and 8.

Figure 10:
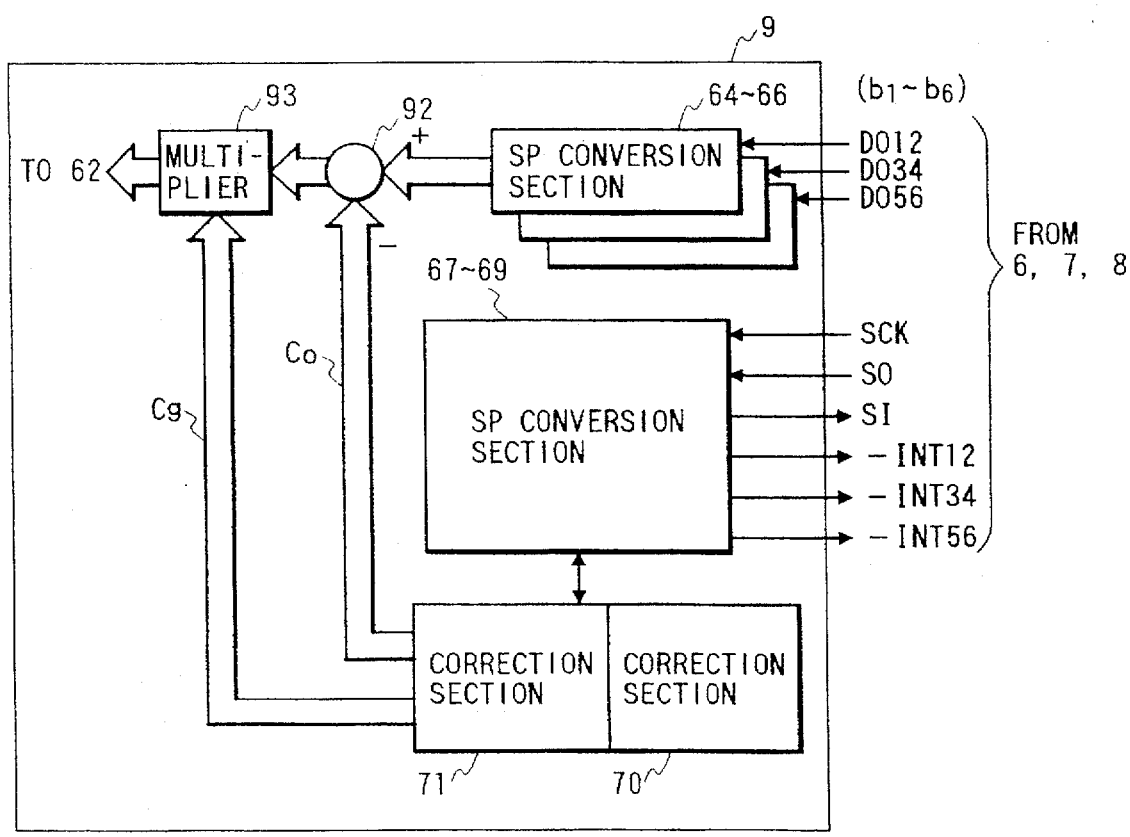
FIG. 10 is a block diagram for a description of the principle of an offset correction circuit and a gain correction circuit in the current detector.

FIG. 10 is a diagram for a description of the operating principle of a circuit which is provided for the offset correction and gain correction of the variable gain amplifier 86 through 89. The correcting circuit operates as follows: As shown in FIG. 10, series data DO12, D034 and D056 for six axes are applied from the biaxial inverter units 6, 7 and 8 to the SP conversion sections 64, 65 and 66, where they are converted into parallel data (for twelve (12) channels). The data thus processed is applied to a subtracter 91, while an offset correcting data Do provided by a correcting section 71 is also applied to the subtracter 91, so that the offset correcting data Do is subtracted from the data DO12, DO34 and DO56. The correct data (with the offset component being removed) is applied to a multiplier 93 where it is multiplied by a gain correcting data Cg corresponding to a gain which is required for the motor control system. Thus, the resultant current detection value data, which have been offset-corrected and gain-corrected, for twelve channels are fed back to the current control section 62.

Figure 11:
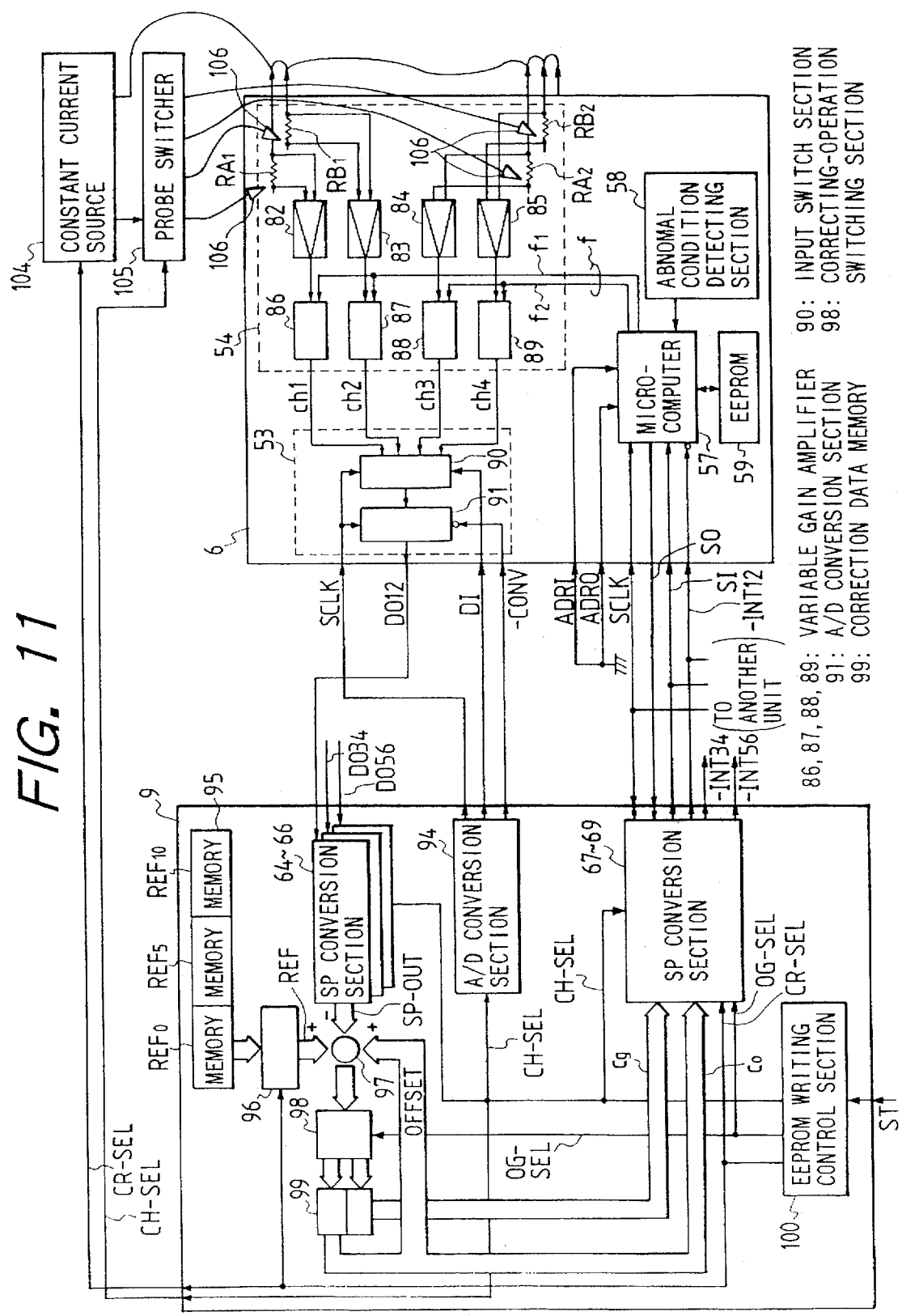
FIG. 11 is a block diagram for a description of an automatic correcting circuit for offset correction and for gain correction of the current detector.

FIG. 11 shows the correcting circuit which automatically performs the above-described offset correction and gain correction. First, the offset correction will be described. For this purpose, it is essential to detect the sum of the amounts of offset in the insulating amplifiers 82 through 85, the variable gain amplifiers 86 through 89, the input switching section 90, and the A/D converter 91. By way of example, total adjustment of the amounts of offset and gain in one channel (the insulating amplifier 82, the variable gain amplifier 86, the input switching section 90, and the A/D converter 91) will be described. The same description may be said about the remaining channels.

In order to detect the amount of offset, no dummy current is applied to the output line of the inverter 52 (0A), and the output data (current detection value) of the A/D converter 53 is applied through the SP conversion section 64, as data SP-OUT, to a subtracter 97. On the other hand, a memory 95 applies a target value REF0 (0A) through a target value switching section 96 to the subtracter 97. In this operation, no voltage drop occurs with the current detecting resistors RA1 and RB1, and the current detection value outputted by the A/D converter 53 is 0A.

Hence, the difference provided by the subtracter 97 is the sum of the amounts of offset of the variable gain amplifier 86, the input switching section 90, and the A/D conversion section 91. Hence, the difference is applied through a correcting-operation switching section 98 to a correction data memory 99, where it is stored as the offset data Co of the variable gain amplifier 86. At the same time, it is converted by the SP conversion section 67 into serial data, which is applied through a microcomputer 57 to an EEPROM 59, where it is written.

Next, in a 5A operation mode, the calculation of gain correcting data Cg and the writing it in the EEPROM 59 are carried out. First, a dummy current of 5A flows in the output line of the inverter 52 with the aid of a constant current source 104, a probe switcher 105, and a probe 106. In this operation, the terminal voltage of the current detecting resistor RA1 (i.e., the current detection value) is detected, and is applied to the subtracter 97. On the other hand, the memory 95 applies a target value REF5 (5A) to the subtracter 97, while the correction data memory 99 applies the offset correction data Co to the subtracter 97. Thus, subtraction is carried out, so that, in the 5A operation mode, the gain correction data Cg having no offset component is obtained. The data Cg is stored in the correction data memory 99, and it is applied through the SP conversion section 67 to the microcomputer 57, and written in the EEPROM 59.

Next, in a 10A operation mode, the calculation of gain correcting data Cg and the writing it in the EEPROM 59 are carried out. Similarly as in the case of the above-described 5A operation mode, a dummy current of 10A flows in the output line of the inverter 52 with the aid of the constant current source 104, the probe switcher 105, and the probe 106. In this operation, the terminal voltage of the current detecting resistor RA1 (i.e., the current detection value) is detected, and is applied to the subtracter 97. On the other hand, the memory 95 operates to apply a target value REF10 (10A) to the subtracter 97, while the correction data memory 99 applies the offset correction data Co to the subtracter 97. Thus, subtraction is carried out, so that, in the 5A operation mode, the gain correction data Cg having no offset component is obtained. The data Cg is stored in the correction data memory 99, and it is applied through the SP conversion section 67 to the microcomputer 57, and written in the EEPROM 59.

As can be estimated from the above description, the same operations are performed for the remaining three channels (RB2, RA1, RB2), so that the offset correction data Co, and the gain correction data Cg are automatically obtained, and written in the EEPROM 59.

The above-described series of operations are carried out under the timing control of the EEPROM writing control section 100, which is operated in response to a start signal which is externally applied thereto.

The offset correction data Co and gain correction data Cg thus written are supplied from the EEPROM 59 through the microcomputer 57 to the current control section 62 in the lower control unit 9 during the control operation of the multi-axis motor control system.

As was described above, the offset correction data Co, and the gain correction data Cg can be automatically formed, which results in an improvement in the efficiency of adjustment. Furthermore, since the formation of those data is digitally achieved, the motor control system is considerably high in accuracy.

As was described above, in the motor control system of the invention, the A/D converter of multi-channel input and serial output type is employed so that it is used for a plurality of current detecting means in the casing. This fact means that it is unnecessary to provide the A/D converter for each of the servomotor control means. Hence, when compared with the conventional one, the motor control device of the invention, is small in the number of components and accordingly, in the number of wiring conductors, and simple in construction, and accordingly simple in maintenance work.

In the memory, the gain adjustment data and offset adjustment data of the current detecting means accommodated in one and the same casing, are stored. This fact permits automatization of the adjustment work, thus contributing to economical use of time and labor.

What is claimed is:

1. A motor control system for individually feedback-controlling a plurality of servomotors comprising:

motor drive means for converting DC power into AC power and applying said AC power to said plurality of servomotors;

current detecting means for detecting the current value of said AC current to feed back the current value thus detected to said motor drive means; and A/D converter means for converting an output signal of said current detecting means into a digital signal, wherein at least two of said plurality of servomotors form a unitary group and, said motor drive means, said current detecting means and said A/D converter means are accommodated in a casing for every said unitary group, and said A/D converter means is a converter of multi-channel input and serial output type to which output signals of said current detecting means are applied, wherein the number of said output signals corresponds to the number of said servomotors forming said unitary group, and in which output signals of said current detecting means are selectively subjected to analog-to-digital conversion.

2. A motor control system as claimed in claim 1, wherein said A/D converter means includes: an A/D conversion section; and an input switching section for selectively transmitting output signals of said current detecting means to said A/D conversion section, wherein the number of said output signals corresponds to the number of said servomotors forming said unitary group, and wherein conversion signals of said A/D conversion section are outputted in the form of serial signals.

3. A motor control system as claimed in claim 2, further comprising:

two motor drive means for driving two servo motors;

two current detecting means for detecting drive currents which said two motor drive means apply to said servomotors;

one A/D conversion section; and one input switching section which receives output signals of said two current detecting means and transmits said output signals to said A/D conversion section.

4. A motor control system as claimed in claim 2, further comprising:

a plurality of casing units in which said motor drive means for driving at least two servomotors, said current detecting means and said A/D converter means are accommodated as one unit; and one servo controlling control unit to which conversion signals from said A/D conversion sections in said casing units are applied, and said control unit having a serial/parallel conversion section which processes serial signals from said A/D conversion sections in parallel signals processing mode.

5. A motor control system as claimed in claim 4, wherein said current detecting means includes:

an insulating amplifier to which a drive current detection signal is applied; and a variable gain amplifier to which an output of said insulating amplifier is applied.

6. A motor control system as claimed in claim 2, further comprising:

a memory in which gain adjustment data and offset adjustment data of said current detecting means have been stored, wherein said current detecting means includes:

an insulating amplifier to which a drive current detection signal is applied; and a variable gain amplifier to which an output of said insulating amplifier is applied, said offset adjustment data stored in said memory being offset correction data corresponding to the sum of offset components of said insulating amplifier and variable gain amplifier and said input switching section and A/D conversion section.

7. A motor control system for individually feedback-controlling a plurality of servomotors comprising:

motor drive means for converting DC power into AC power and applying said AC power to said plurality of servomotors; and current detecting means for detecting the current value of said AC current to feed back the current value thus detected to said motor drive means, wherein said motor drive means, said current detecting means, and a memory in which gain adjustment data and offset adjustment data of said current detecting means have been stored are accommodated in a casing for every at least two of said plurality of servomotors.

8. A motor control system as claimed in claim 7, wherein said casing further accommodates an A/D converter means adapted to convert an output signal of said current detecting means into a digital signal to output, said offset adjustment data stored in said memory being offset correction data corresponding to the sum of offset components of said current detecting means and said A/D converter means.

9. A motor control system as claimed in claim 8, wherein said current detecting means includes:

an insulating amplifier to which a drive current detection signal is applied; and a variable gain amplifier to which an output of said insulating amplifier is applied, said offset adjustment data stored in said memory being offset correction data corresponding to the sum of offset components of said insulating amplifier, said variable gain amplifier, and said A/D converter means.

10. A motor control system as claimed in claim 9, wherein said gain adjustment data stored in said memory are gain correction data which are obtained for a plurality of rated drive currents with offset components removed which correspond to said offset adjustment data.

11. A motor control system as claimed in claim 10, wherein said motor drive means for driving at least two servomotors, said current detecting, and said A/D converter means are accommodated as one unit in a casing, a plurality of said units being provided, one servo controlling control unit is provided to which conversion signals from said A/D conversion sections in said units are applied, said control unit having a serial/parallel conversion section which processes serial signals from said A/D conversion section in a parallel signal processing mode, so that said gain adjustment data and offset adjustment data are processed with respect to an output of said serial/parallel conversion section.

12. A motor control system for individually feedback-controlling a plurality of servomotors comprising:

a plurality of motor drive means for converting DC power into AC power and applying said AC power to said plurality of servomotors;

current detecting means for detecting the current value of said AC current to feed back the current value thus detected to said motor drive means;

an A/D converter means for converting an output signal of said current detecting means into a digital signal; and a memory in which gain adjustment data and offset adjustment data of said current detecting means have been stored, wherein said gain adjustment data stored in said memory being gain correction data which are obtained for a plurality of rated drive currents with offset components removed which correspond to said offset adjustment data.

13. A motor control system as claimed in claim 12, wherein said motor drive means, said current detecting means, and said A/D converter means are accommodated in a casing for every at least two of said plurality of servomotors as a unit.

14. A motor control system as claimed in claim 13, wherein said motor drive means for driving at least two servomotors, said current detecting means, and said A/D converter means are accommodated as one unit in a casing, a plurality of said units being provided, one servo controlling control unit is provided to which conversion signals from said A/D conversion sections in said units are applied, said control unit having a serial/parallel conversion section which processes serial signals, which are provided from said A/D conversion section, as parallel signals, so that said gain adjustment data and offset adjustment data are processed with respect to an output of said serial/parallel conversion section.

* * * * *